United States Patent [19]

Asai

[11] Patent Number: 4,733,442
[45] Date of Patent: Mar. 29, 1988

[54] CONNECTING APPARATUS FOR LINES

[75] Inventor: Masaki Asai, Nagoya, Japan

[73] Assignee: Meitoh Denki Kohji Kabushiki Kaisha, Aichi, Japan

[21] Appl. No.: 922,963

[22] Filed: Oct. 24, 1986

[30] Foreign Application Priority Data

Dec. 20, 1985 [JP] Japan .................... 60-288888

[51] Int. Cl.⁴ ............................. F16D 1/00
[52] U.S. Cl. .................... 24/590; 403/341; 403/342
[58] Field of Search ........... 24/590, 591, 594, 599, 24/136 L, 136 B, 514, 569; 403/341, 342; 411/554

[56] References Cited

U.S. PATENT DOCUMENTS

| 472,392 | 4/1892 | Pfeil | 403/341 |
| 867,312 | 10/1907 | Shutz | 403/341 |
| 1,975,244 | 10/1934 | Wiseman | 403/341 |
| 2,125,303 | 8/1938 | McRoberts | 403/342 |
| 2,591,437 | 4/1952 | Jun | 403/341 |
| 4,260,181 | 4/1981 | Curtin | 403/341 |
| 4,277,197 | 7/1981 | Bingham | 403/342 |
| 4,376,592 | 3/1983 | Martinek | 403/341 |

FOREIGN PATENT DOCUMENTS 122770 10/1927 Switzerland ............ 403/342

Primary Examiner—Victor N. Sakran
Attorney, Agent, or Firm—Armstrong, Nikaido, Marmelstein & Kubovcik

[57] ABSTRACT

A connecting apparatus having a pair of connector elements each having an end piece to which a line, such as a rope or a cable etc. is connected, and which has a complemental opposed end face so as to come into contact with each other without relative rotation therebetween. The end pieces are connected together in and by a nut member. One of the end pieces has an outer peripheral threaded portion which can be screwed in the nut member.

11 Claims, 7 Drawing Figures

4,733,442

CONNECTING APPARATUS FOR LINES

BACKGROUND OF THE INVENTION

1. Field of the Invention

The present invention relates to an apparatus for connecting lines, such as cables, cords, wires, or ropes or the like, and particularly it relates to a connecting apparatus which can be advantageously used to connect ropes used in a stringing operation of power transmission cables so as to tense or fix the latter.

Furthermore, the present invention can be also adapted to connect ropes or wires for rope construction, such as a suspension bridge, a ropeway or a cable railway, etc., or ropes or wires for supporting masts or posts of the like.

2. Description of the Related Art

Ropes which are used in a stringing operation of power transmission cables usually have looped ends which can be connected to or engaged by another cable or the like for extension.

The looped end is usually made in a so-called eye-splice process in which the strands of the terminal end of the rope are frayed and twisted, so that the strands are woven into the terminal end portion of the rope itself. The eye-splice provides a relatively large strength, in comparison with other connecting means such as chips or the like. This, however, needs a relatively complex operation with a highly skilled person.

SUMMARY OF THE INVENTION

The primary object of the present invention is to provide a simple apparatus for connecting lines, such as cables, ropes, wires or the like, which is free from troublesome operations involved in the eye-splice process.

In order to achieve the object of the invention mentioned above, according to the present invention, there is provided an apparatus for connecting lines comprising a pair of connector elements, each having an end piece to which a line to be connected can be connected. The end pieces have opposed end faces which come into contact with each other and which have complemental shapes to each other. At least one of the end pieces is provided with an outer peripheral threaded portion and the other end piece is provided with an abutment. A nut member is provided in which the end pieces can be inserted, so that the threaded portion of the end piece is screwed in the nut member. The nut member is provided with a counter abutment which can be engaged by is abutment of the end piece, so that when the end pieces are inserted in the nut member, the end pieces can be integrally connected in and to the nut member by the screw engagement between the threaded portion of the end piece and the nut member and by the engagement between the abutment and the counter abutment.

BRIEF DESCRIPTION OF THE DRAWINGS

The invention will be described in detail below with reference to the accompanying drawings, in which.

DESCRIPTION OF PREFERRED EMBODIMENTS

Figure 1:
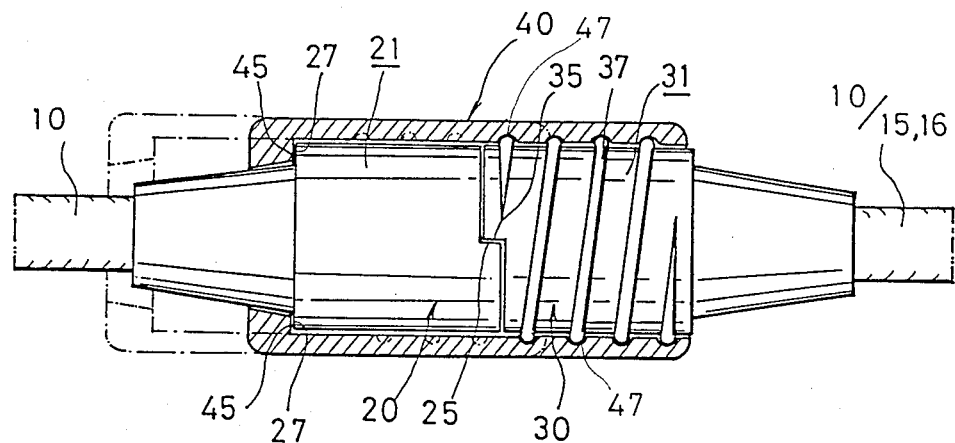
FIG. 1 is a longitudinal sectional view of a connecting apparatus according to the present invention.

As can be seen from FIG. 1 the connecting apparatus of the invention has a pair of connector elements 20 and 30 which have end pieces 21 and 31 having ropes 10 connected thereto or other anchoring or connecting means 15 or 16 to which ropes etc. are connected, respectively. Each of the end pieces 21 and 31 is preferably made of a cylindrical metal plate of iron or chromium molybdenum steel, or the like.

Figure 2:
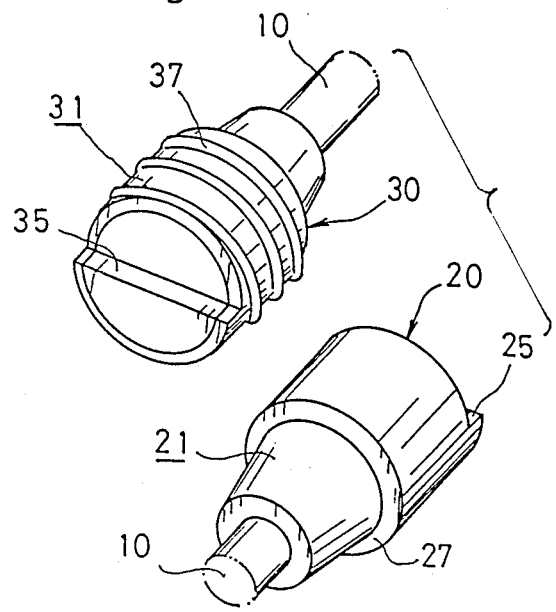
FIG. 2 is an exploded perspective view of connector elements shown in FIG. 1.

The cylindrical end piece 21 of the connector element 20 has stepped end 25 opposed to the end piece 31. The rope 10 (or 15, 16) is connected to the other end of the end piece 21. The end piece 21 is also provided, on its outer periphery, with a shoulder portion 27. The stepped end 25 can be made by cutting a half of the circular end face of the end piece 21 away, so that the stepped end 25 consists of a semicircular projection and a semicircular recess. The peripheral shoulder portion 27 has a continuous annular shoulder face, as can be see in FIG. 2.

The end piece 31 of the connector element 30 has a stepped end 35 which has a shape complemental to the shape of the stepped end 25, so that the stepped end 35 can be snugly engaged by the stepped end 25 of the end piece 21 when the two end pieces 21 and 31 come into contact with each other.

The end piece 31 is provided, on its outer periphery, with a threaded portion 37 which can be engaged in a nut member 40 which will be described in detail hereinafter. The two end pieces 21 and 31 are aligned on a line and are brought into contact with each other so that the stepped end faces of the stepped ends 25 and 35 face to each other. When the stepped ends 25 and 35 are opposed to each other, the semicircular recessed portion of the stepped end 25 comes into contact with the semicircular projection of the end 35 and the semicircular projection of the end 25 comes into contact with the semicircular recessed portion of the end 35, respectively, so that the two end pieces 21 and 31 are connected to each other so as not to relatively rotate.

The cylindrical hollow nut member 40 has a restricted end face (a counter abutment) 45 at its one end, so that the shoulder portion (abutment) 27 of the end piece 21 comes into contact with the end face 45 when the end piece 21 is inserted in the nut member 40 to prevent the end piece 21 from coming out of the nut member 40. The nut member 40 is provided, on its opposite end, with a female threaded portion 47 on the inner periphery thereof. The threaded portion 37 of the end piece 31 can be screwed into the threaded portion 47 of the nut member 40. Thus, the two connector elements 20 and 30 can be connected together in and by the nut member 40. The nut member 40 is preferably made of iron or chromium molybdenum steel similar to the end pieces 21 and 31. When the end piece 31 is screwed into the nut member 40, the shoulder portion 27 of the end piece 21 is tightly pressed against the inner end face 45 of the nut member 40.

The connection of the rope 10 to the end piece 21 or 31 can be effected as follows.

Figure 3:
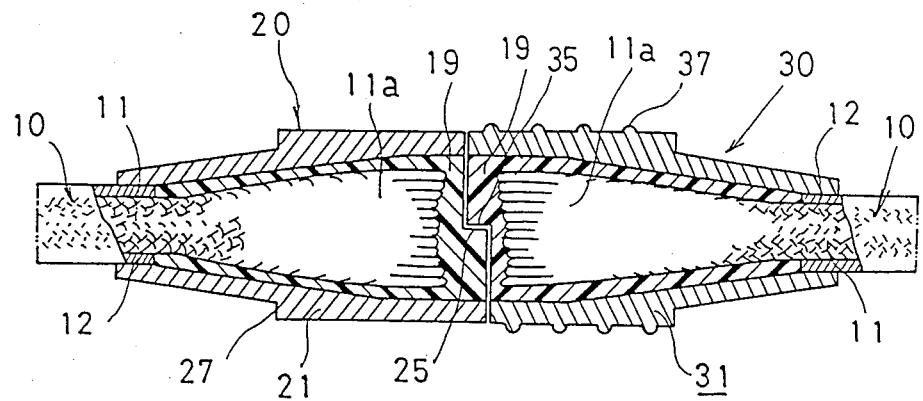
FIG. 3 is a longitudinal sectional view of connector elements shown in FIG. 1.

With reference to FIG. 3, the end portion 11a of the strand 11, of which the rope 10 is made is frayed and spread together with a resin adhesive 19, such as epoxy resin in the associated hollow end piece 21 or 31, so that the frayed ends of the strand 11 can be firmly connected to and in the end piece by the adhesive 19. The numeral 12 designates a protecting insulation layer of the rope 10, such as polyurethane.

Figure 4:
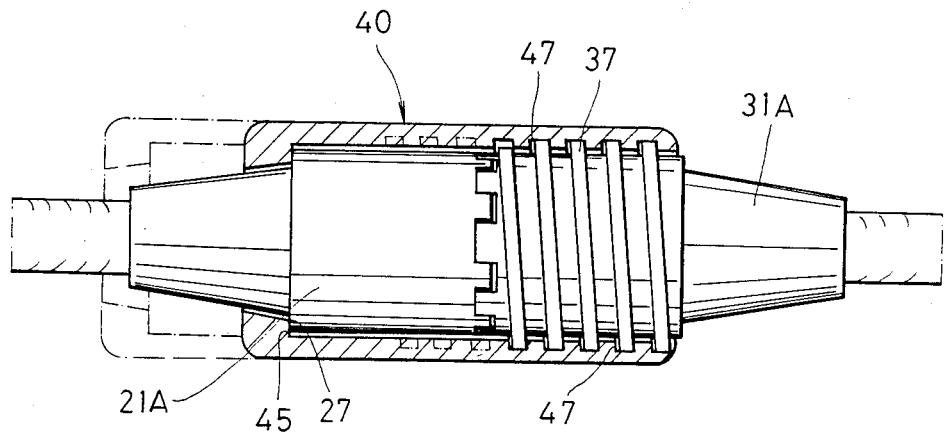
FIG. 4 is a longitudinal sectional view of a connecting apparatus according to another embodiment of the present invention.
Figure 5:
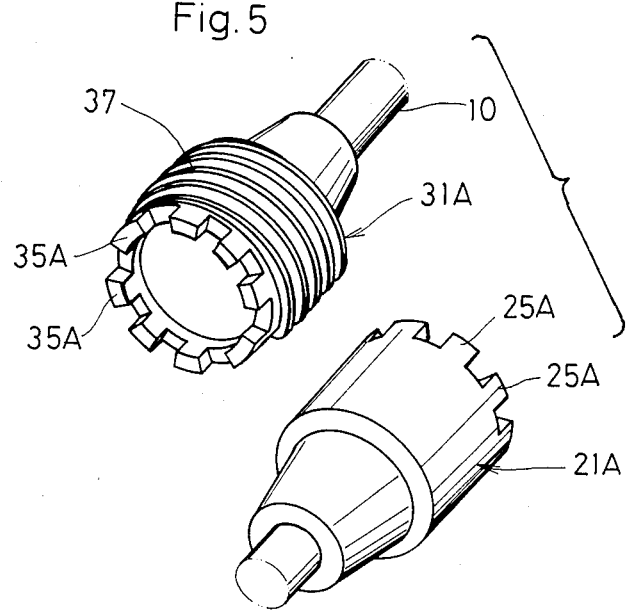
FIG. 5 is an exploded perspective view of connector elements shown in FIG. 4.

FIGS. 4 and 5 show a variant of the end pieces 21A and 31A. In the arrangement illustrated in FIGS. 4 and 5, the end piece 21A has spaced circumferential projections 25A on its one end, and the end piece 31A has, on its one end, spaced circumferential projections 35A which are complementary to the spaced projections 25A of the end piece 21A. Elements other than the complemental end shapes of the end pieces 21A and 31A are same as those shown in FIG. 1.

Figure 6:
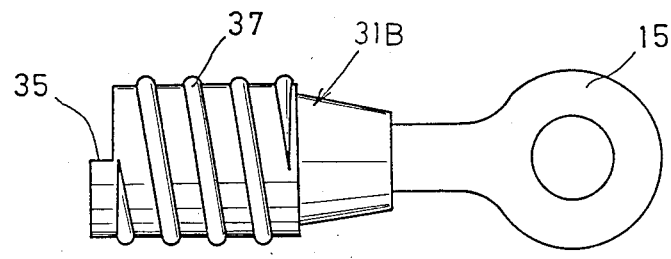
FIG. 6 is a side elevational view of a connector element with an eye piece; and, FIG. 7 is a side elevational view of a connector element with a connecting jaw.
Figure 7:
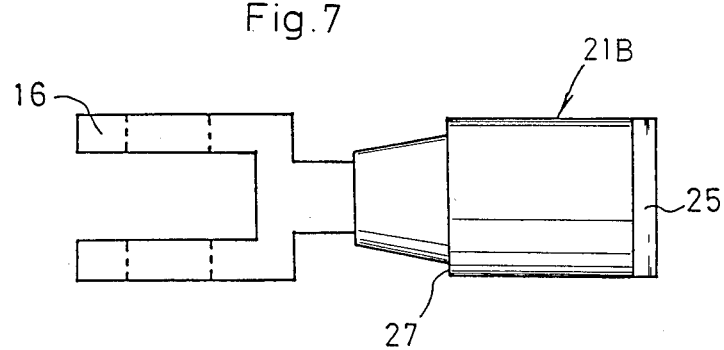

In a different embodiment shown in FIGS. 6 and 7, the end pieces 21B and 31B have an eye piece 15 and a connecting jaw 16 instead of the ropes 10, respectively. The eye piece 15 and the jaw 16 can be connected to the respective end pieces 21B and 31B, for example, by means of welding. Alternatively, it is also possible to make the eye piece and the jaw integral with the respective end pieces as a single piece, respectively.

As can be understood from the above discussion, according to the present invention, ropes, wires, cables or the like can be easily connected by means of the respective end pieces connected thereto and the nut member which can be engaged by the end pieces. Furthermore, according to the present invention, since the end faces of the opposed end pieces have complemental shapes, no rotation between the end pieces takes place, when they are connected to each other with the help of the nut member which is rotated when fastened. The end pieces can be easily connected not only to ropes, wires, cables or other line materials, but also to connecting means, such as eye pieces, hook or connecting jaws, etc., to which the ropes or the like is connected. According to the present invention, since no eye-splice process is necessary, unlike the prior art, no highly skilled operator needs in stringing operation. In addition to the foregoing, the connecting apparatus of the present invention can be mass-produced.

I claim:

1. A connecting apparatus for lines comprising: a pair of connector elements having end pieces which have opposed end faces, said opposite end faces of said pair of connector elements coming into abutting contact with each other, said end faces having a plurality of complemental shapes to each other, at least one of said end pieces being provided with an outer peripheral threaded portion and the other end piece being provided with an abutment; and
 a nut member in which said end pieces can be inserted so that said threaded portion of the end piece is screwed in the nut member, said nut member being provided with a counter abutment which can be engaged by said abutment of the end piece, so that, when the end pieces are inserted in the nut member, the end pieces can be integrally connected in and to the nut member by the screw engagement between the threaded portion of the end piece and the nut member and by the engagement between said abutment and the counter abutment.

2. An apparatus according to claim 1, wherein said end pieces have a plurality of complemental projections and a plurality of recesses on their opposed end faces.

3. An apparatus according to claim 1, wherein said abutment is made of an annular shoulder face provided on one of the end pieces and wherein said counter abutment is made of a restricted end face provided on the nut member.

4. An apparatus according to claim 1, wherein each of said end pieces has a rope connected thereto, made of strands.

5. An apparatus according to claim 1, wherein ropes are connected to the respective end pieces, so that strands of said rope are frayed and spread in the end pieces together with an adhesive.

6. An apparatus according to claim 1, wherein at least one of said end pieces has, at its one end, an eye piece.

7. An apparatus according to claim 1, wherein at least one of said end pieces has, at its one end, a connecting jaw.

8. An apparatus according to claim 1, wherein each of said end pieces comprises a substantially cylindrical hollow body.

9. A connecting apparatus for lines comprising:
 a pair of connecting elements having end pieces which have opposed complimentary end faces, each end face having a plurality of projections and a plurality of recesses, said plurality of projections and said plurality of recesses being complemental to each other, said opposed end faces coming into abutting contact by having said plurality of projections of one end face abut said plurality of recesses on the other end face, at least one of said end pieces being provided with an outer peripheral threaded portion and the other end piece being provided with an abutment; and
 a nut member in which said end pieces can be inserted so that said threaded portion of the end piece is screwed in the nut member, said nut member being provided with a counter abutment which can be engaged by said abutment of the end piece, so that, when the end pieces are inserted in the nut member, the end pieces can be integrally connected in and to the nut member by the screw engagement between the threaded portion of the end piece and the nut member and by the engagement between said abutment and the counter abutment.

10. An apparatus according to claim 9 wherein each of said end pieces comprises a substantially cylindrical hollow body having a rope connected therein by an adhesive means.

11. A connecting apparatus for lines comprising:
 a pair of connector elements have end pieces, each of said end pieces comprising a substantially cylindrical hollow body, said end pieces having opposed end faces, said opposed end faces coming into abutting contact with each other, said end faces having a plurality of complemental shapes to each other, each of said end pieces having a rope connected inside said cylindrical hollow body by an adhesive means, at least one of said end pieces being provided with outer peripheral threaded portions and the other end piece being provided with an abutment; and
 a nut member in which said end pieces can be inserted so that said threaded portion of the end piece is screwed in the nut member, said nut member being provided with a counter abutment which can be engaged by said abutment of the end piece, so that, when the end pieces are inserted in the nut member, the end pieces can be integrally connected in and to the nut member by the screw engagement between the threaded portion of the end piece and the nut member and by the engagement between said abutment and the counter abutment.

* * * * *